US012754039B2

(12) United States Patent
Rohde et al.

(10) Patent No.: US 12,754,039 B2
(45) Date of Patent: Oct. 6, 2026

(54) METHOD FOR GENERATING A DIGITAL MAP

(71) Applicant: Robert Bosch GmbH, Stuttgart (DE)

(72) Inventors: Jan Rohde, Stuttgart (DE); Roland Langhans, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 18/660,793

(22) Filed: May 10, 2024

(65) Prior Publication Data

US 2024/0385012 A1 Nov. 21, 2024

(30) Foreign Application Priority Data

May 17, 2023 (DE) ..................... 10 2023 204 608.3

(51) Int. Cl.
*G01C 21/00* (2006.01)

(52) U.S. Cl.
CPC ................................ *G01C 21/3837* (2020.08)

(58) Field of Classification Search
CPC .................................................. G01C 21/3837
See application file for complete search history.

(56) References Cited

PUBLICATIONS

Bachute "Autonomous Driving Architectures : Insights of Machine Learning and Deep Learning Algorithms" (Year: 2021).*
Friedman "Simple and Efficient Oracle-Based Consensus Protocols for Asynchronous Byzantine Systems" (Year: 2005).*
Golle, "Uncheatable Distributed Computations" (Year: 2001).*
GolleDate (Year: 2001).*
Yin, Separating Agreement from Execution for Byzantine Fault Tolerant Services (Year: 2003).*

* cited by examiner

*Primary Examiner* — Aryan E Weisenfeld
(74) *Attorney, Agent, or Firm* — Norton Rose Fulbright US LLP

(57) ABSTRACT

A method for processing data by means of hardware secured according to specified security criteria. The method includes the following steps. First, the data are read in. Diverse data records are then generated from the data. The diverse data records are then sent to various computers that are not secured according to specified security criteria. The computers can then engage in processing of the data records, for example to process map data. The processed data records are then read in again. The processed data records are then compared using a similarity assessment, and a final result of the processing of the data is determined based on the comparison of the processed data records. The final result is then output.

11 Claims, 4 Drawing Sheets

METHOD FOR GENERATING A DIGITAL MAP

CROSS REFERENCE

The present application claims the benefit under 35 U.S.C. § 119 of German Patent Application No. DE 10 2023 204 608.3 filed on May 17, 2023, which is expressly incorporated herein by reference in its entirety.

FIELD

The present invention relates to a method for generating a digital map, a data processing method, a computing unit and a system including a computing unit and at least one vehicle.

BACKGROUND INFORMATION

The detection of a vehicle's environment using sensors, such as radar, lidar, ultrasound and/or cameras, is a fundamental component of modern driver assistance systems and automated vehicle systems. In this context, the employed environment models are often supplemented by additional map information, such as roadways outside the sensor field of view. The map data used for this (for example from planning maps, localization maps or behavior maps) are made available to the vehicle system via a map service.

Among modern sensor systems (e.g., radar, video, lidar, ultrasound, cameras), there are many examples of sensors that have to meet the functional safety requirements. These safety requirements can, for example, be ASIL in accordance with ISO 26262 for clearly defined safety targets. No such solutions with economic feasibility are known for crowd-sourcing-based map services.

A large number of algorithms are available for creating, expanding and updating maps for use in vehicle systems. Furthermore, such map services are already available on the market. Furthermore, systems are available that divide mapping data into different data records and calculate them separately to form localization maps with the aim of increasing the robustness of the mapping pipeline.

SUMMARY

An object of the present invention is to provide a method for generating a digital map that meets security requirements. Another object of the present invention is to provide a data processing method, a computing unit, and a system including a computing unit and at least one vehicle with which the method can be carried out. These objects may be achieved by features of the present invention. Advantageous example embodiments and developments of the present invention are disclosed herein.

The present invention relates to a method for processing data by means of hardware secured according to specified security criteria. According to an example embodiment of the present invention, the method comprises the following steps: First, the data are read in. Diverse data records are then generated from the data. The diverse data records are then sent to various computers that are not secured according to specified security criteria. The computers can then process the data records, for example to edit map data. The processed data records are then read in again. The processed data records are then compared using a similarity assessment, and a final result of the data processing is determined based on the comparison of the processed data records. The final result is then output.

A main feature of the method for processing data is to carry out the explained method steps of the present invention on the hardware secured according to the specified security criteria and to outsource the processing of the data records to the unsecured computers. Since most of the computing time is required in particular when processing the data records, this method can be used to achieve a secure end result, even though the most computationally intensive method steps are not carried out on secure hardware.

According to an example embodiment of the present invention, when determining the final result, the processed data records can be selected, and/or the processed data records can be merged. For example, it can be determined that a processed data record deviates significantly from the other processed data records, for example using statistical methods. The deviating processed data record can then be rejected while the other processed data records are merged to form the final result.

The diverse data records and the processed data records between the secure hardware and the computers can, for example, be transmitted wirelessly or wired.

According to an example embodiment of the present invention, the method can also include processing the diverse data records on the computers.

In one example embodiment of the method for processing data according to the present invention, in addition to the diverse data records, a processing program is output to the computers that are not secured according to specified security criteria.

This makes it possible to output the diverse data records and the processing program to data centers in the cloud so that the cheapest available computing capacity can be used if necessary.

In one example embodiment of the method for processing data according to the present invention, the diverse data records are generated disjointly. This can mean that each data point available in the data is only used for a single diverse data record.

In one example embodiment of the method for processing data according to the present invention, the data are distributed to the data records on the basis of criteria and/or on the basis of metadata while generating the diverse data records. This can reduce the deviation of the processed data records from one another or reduce the probability of statistical outliers in the processed data records.

In one example embodiment of the method for processing data according to the present invention, the comparison of the processed data records using the similarity assessment is used to adjust the diverse data records. The diverse data records are then output again to different computers that are not secured according to specified security criteria, and processed data records are read in again. The adjustment can be carried out in such a way that the individual data points are distributed differently to the diverse data records compared to the first run of the method. This method can be used, for example, to identify whether one of the computers is providing incorrect data.

In one example embodiment of the method for processing data according to the present invention, the adapted diverse data records are output to different computers than in the first output to the computers. This method can be used, for example, to identify whether one of the computers is providing incorrect data.

The data of the described method of the present invention can, in particular, be sensor data from vehicles that are transmitted, for example. The criteria and/or the metadata can then include, for example, that differences between the data records are as different as possible (for example with regard to the time of data recording or the fleet vehicles). This allows an increase in the entropy of the disjoint data records to be achieved.

The present invention further relates to a method for generating a digital map. According to an example embodiment of the present invention, in this method, sensor data are generated by means of vehicle sensors, and then the already described method is carried out, wherein the sensor data are processed, and the end result contains a digital map. The digital map is then issued to at least one vehicle. In particular, the sensor data can be transmitted wirelessly.

The present invention also relates to a computing unit which, according to an example embodiment, is configured to read in data, generate diverse data records from the data, output the diverse data records to various computers which are not secured according to specified security criteria, read in processed data records, carry out a comparison of the processed data records using a similarity assessment, determine a final result of the processing of the data using the comparison of the processed data records, and output the final result. In particular, the computing unit can contain secure hardware for carrying out these steps.

The computing unit can be located inside a vehicle, for example, but also in a data center.

Such a computing unit can carry out the method for processing data according to the present invention.

In one example embodiment of the present invention, the computing unit is also configured to read in sensor data from vehicle sensors as the data, and to output a digital map. Such a computing unit can carry out the method according to the present invention for generating a digital map. This computing unit can be arranged inside a vehicle, for example. In this case, it can be provided that the computers are also arranged in the vehicle, but not secured. Furthermore, the computers can be arranged in a data center, and the diverse data records can be output to the computers wirelessly. Alternatively, it is also possible to arrange the computing unit in a data center. The sensor data can then be output to the computing unit wirelessly.

The present invention also relates to a system consisting of such a computing unit and a vehicle with a vehicle sensor. The vehicle is configured to output sensor data from the vehicle sensor to the computing unit and to receive the digital map. The computing unit can be arranged in the vehicle or in a data center. Furthermore, the system can include a plurality of vehicles with a vehicle sensor, wherein each of the vehicles is configured to output sensor data from the vehicle sensor to the computing unit and to receive the digital map.

Exemplary embodiments of the present invention are explained with reference to the figures.

DETAILED DESCRIPTION OF EXAMPLE EMBODIMENTS

Figure 1:
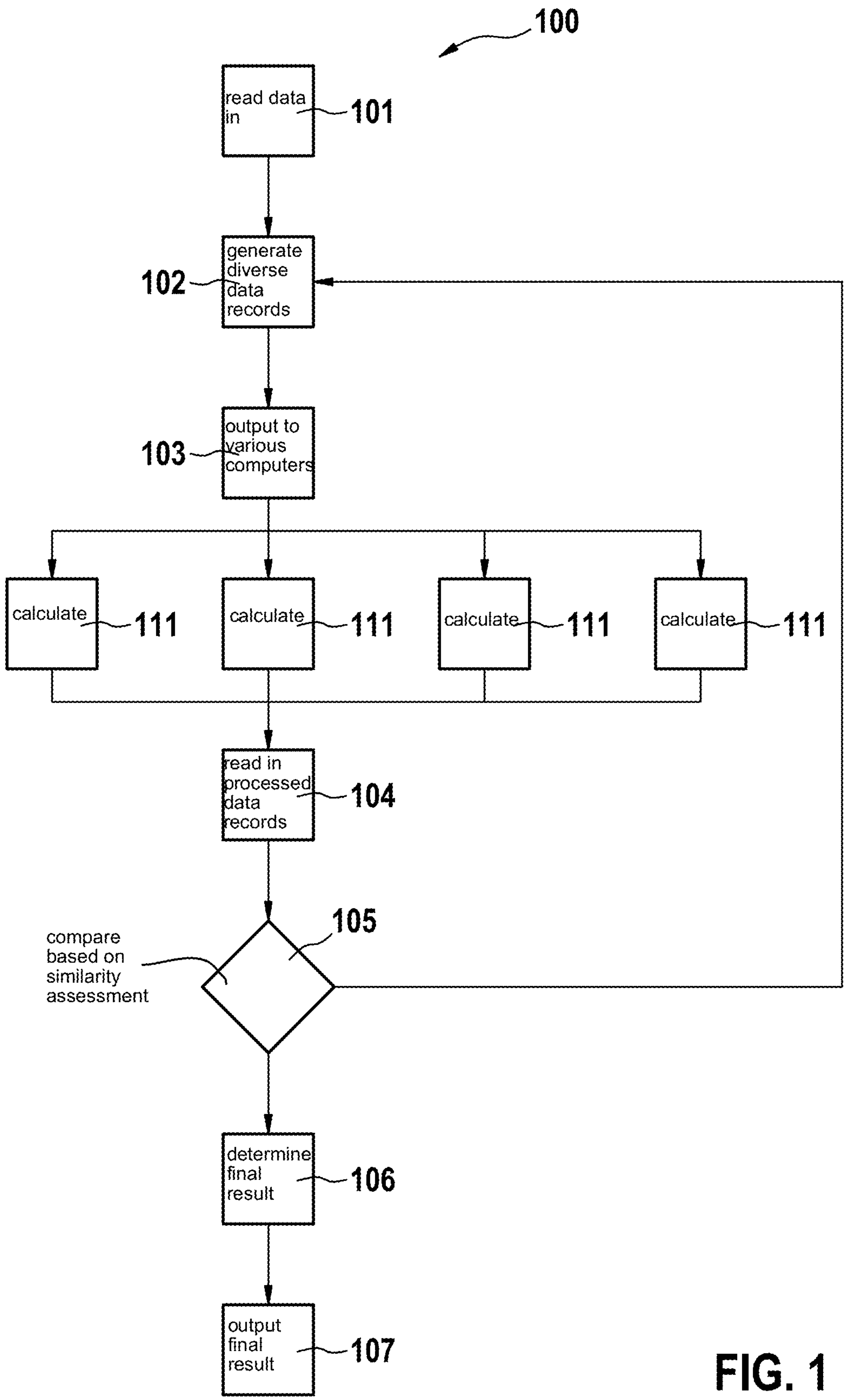
FIG. 1 shows a flow chart of a method for processing data, according to an example embodiment of the present invention.

FIG. 1 shows a flow chart 100 of a method for processing data using hardware secured according to specified security criteria. In a first reading-in step 101, data are read in. From the data, diverse data records are then generated in a generation step 102. The diverse data records are then output in a first output step 103 to various computers that are not secured according to specified security criteria. The computers can execute a processing of the data records in an optional calculation step 111, for example to process map data. To accomplish this, FIG. 1 shows four calculation steps 111 carried out in parallel, wherein the number of calculation steps can be different from four. The processed data records are then read in again in a second reading-in step 104. The processed data records are then compared in a comparison step 105 on the basis of a similarity assessment, and a final result of the processing of the data is determined in a determination step 106 on the basis of the comparison of the processed data records. The final result is then output in a second output step 107.

The core of the method for processing data is to carry out the explained method steps 101, 102, 103, 104, 105, 106, 107 on the hardware secured according to specified security criteria and to outsource the processing of the data records to the non-secured computers in calculation step 111. Since most of the computing time is required in particular when processing the data records, i.e., the calculation steps 111, this method can be used to achieve a secure end result, even though the most computationally intensive method steps are not carried out on secure hardware.

When determining the final result, the processed data records can be selected, and/or the processed data records can be merged. For example, it can be determined that a processed data record deviates significantly from the other processed data records, for example using statistical methods. The deviating processed data record can then be rejected while the other processed data records are merged to form the final result.

The diverse data records and the processed data records between the secure hardware and the computers can, for example, be transmitted wirelessly or wired.

The method can also include processing the diverse data records on the computers.

In one exemplary embodiment of the method for processing data, in addition to the diverse data records in a first processing step 103, a processing program is output to the computers that are not secured according to specified security criteria. This makes it possible to output the diverse data records and the processing program to data centers in the cloud so that the cheapest available non-secure computing capacity can be used if necessary.

In one exemplary embodiment of the method for processing data, the diverse data records are generated disjointly in the generating step 102. This can mean that each data point available in the data is only used for a single diverse data record.

In one exemplary embodiment of the method for processing data, the data are distributed to the data records in the generating step 102 on the basis of criteria and/or on the basis of metadata while generating the diverse data records. This can reduce the deviation of the processed data records from one another or reduce the probability of statistical outliers in the processed data records.

In one exemplary embodiment of the method for processing data, the comparison of the processed data records using the similarity assessment is used to adjust the diverse data records. This is optionally shown in FIG. 1. If the comparison step 105 shows that the processed data records are inconsistent, the method can jump back to the generation step 102 and adapt or regenerate the diverse data records. The first output step 103 is then repeated so that the diverse data records are again output to different computers that are not secured according to specified security criteria. The optional calculation steps 111 can now be run through again. The second reading-in step 104 is also run through again, and processed data records are read in again. The comparison step 105 can now be carried out again, after which, if the processed data records are consistent, the determination step 106 can be carried out, and otherwise a further run starting from the generation step 102 is possible. The adjustment when re-running the generation step 102 can be performed such that the individual data points are distributed differently to the diverse data records compared to the first run of the method. This method can be used, for example, to identify whether one of the computers is providing incorrect data.

In one exemplary embodiment of the method for processing data, the adjusted diverse data records are output to different computers after each re-run of the generating step 102 than during the first output to the computers. This method can be used, for example, to identify whether one of the computers is providing incorrect data. In particular, when the generation step 102 is run through again, it can be provided that the diverse data records can be adapted so that there is only a single output to other computers.

The data of the described method can, in particular, be sensor data from vehicles that are transmitted, for example. The criteria and/or the metadata can then include, for example, that differences between the data records are as different as possible (for example with regard to the time of data recording or the fleet vehicles). This allows an increase in the entropy of the disjoint data records to be achieved.

Figure 2:
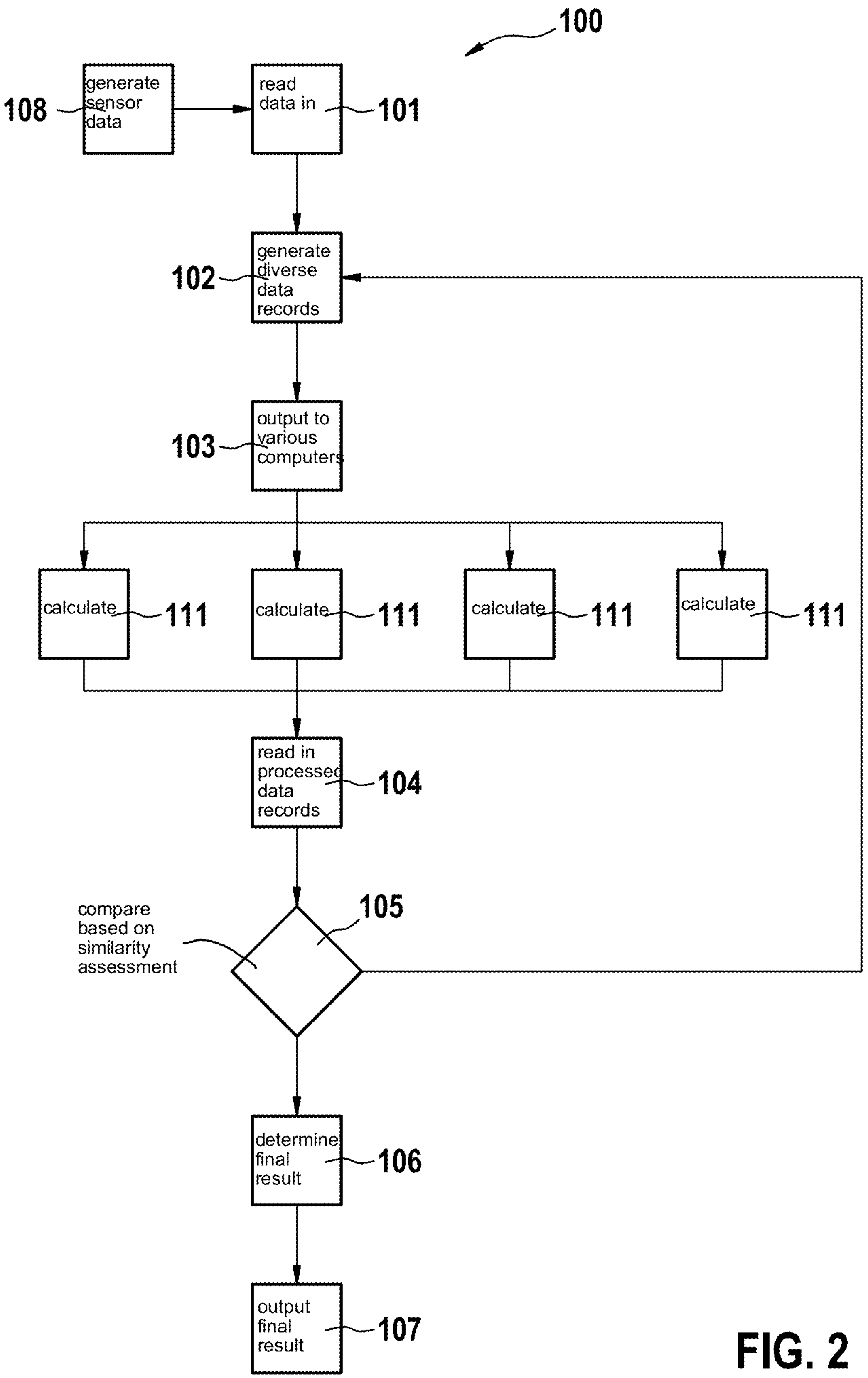
FIG. 2 shows a flow chart of a method for generating a digital map, according to an example embodiment of the present invention.

FIG. 2 shows a flow chart 100 of a method for generating a digital map. In this method, sensor data are generated by means of vehicle sensors in a sensor evaluation step 108, and then the already described method is carried out, wherein the sensor data are processed, and the end result contains a digital map. The digital map is then output to at least one vehicle in the second output step 107. In particular, the sensor data can be transmitted wirelessly.

Figure 3:
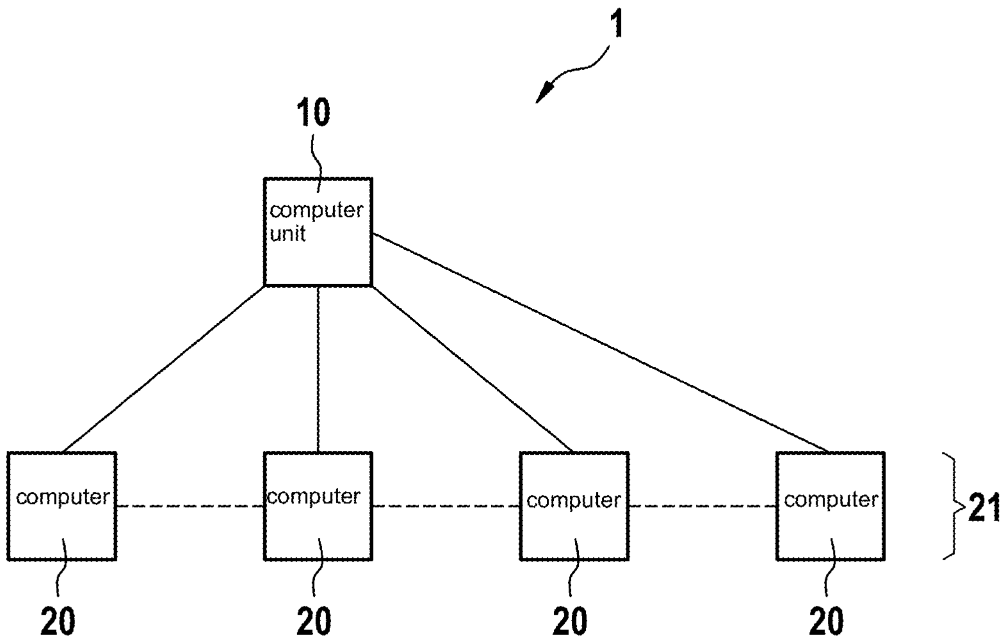
FIG. 3 shows a computer network, according to an example embodiment of the present invention.

FIG. 3 shows a computer network consisting of a computer unit 10 and a plurality of computers 20, wherein four computers 20 are shown in FIG. 3. In particular, the computers 20 can be computers 20 that are not secured according to specified security criteria. The computing unit 10 is configured to read in data, generate diverse data records from the data, output the diverse data records to the computers 20, read in processed data records again from the computers 20, carry out a comparison of the processed data records using a similarity assessment, determine a final result of the processing of the data using the comparison of the processed data records, and output the final result. In particular, the computing unit 10 can contain secure hardware for carrying out these steps.

The computing unit 10 can be located inside a vehicle, for example, but also in a data center. The computers 20 can be networked with each other, as indicated by the dashed lines in FIG. 3. The computers 20 and possibly also the computing unit 10 can be arranged in a cloud 21. A computing unit 10 as shown in FIG. 3 can perform the method shown in FIG. 1 for processing data.

The computing unit 10 can also be configured to read in sensor data from vehicle sensors as the data, and to output a digital map. Such a computing unit 10 can carry out the method shown in FIG. 2 for generating a digital map. This computing unit 10 can be arranged inside a vehicle, for example.

Figure 4:
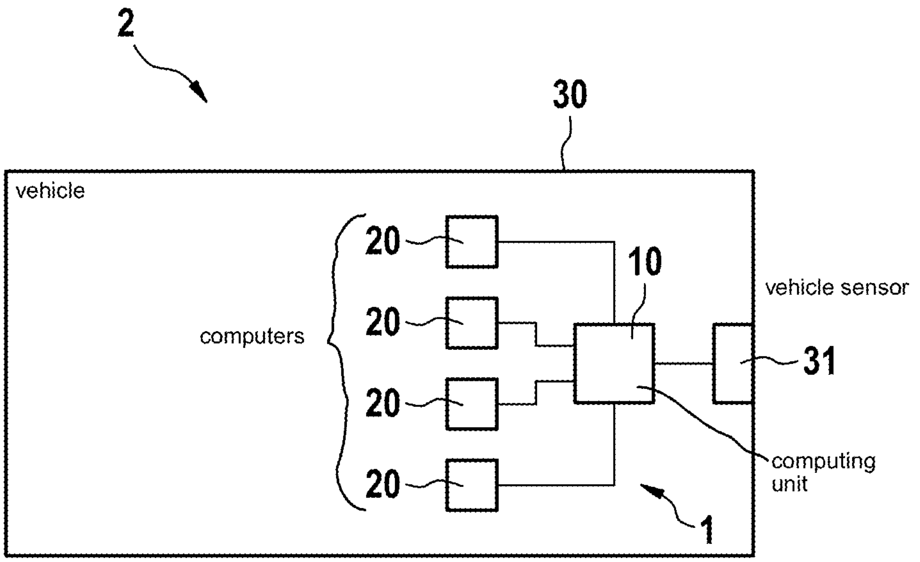
FIG. 4 shows a system consisting of a computing unit and a vehicle, according to an example embodiment of the present invention.

FIG. 4 shows a system 2 consisting of a computing unit 10 and a vehicle 30. The computing unit 10 is arranged in the vehicle 30. The vehicle 30 also has a vehicle sensor 31 connected to the computing unit 10. The computers 20 are also arranged in the vehicle, but are not secured.

Figure 5:
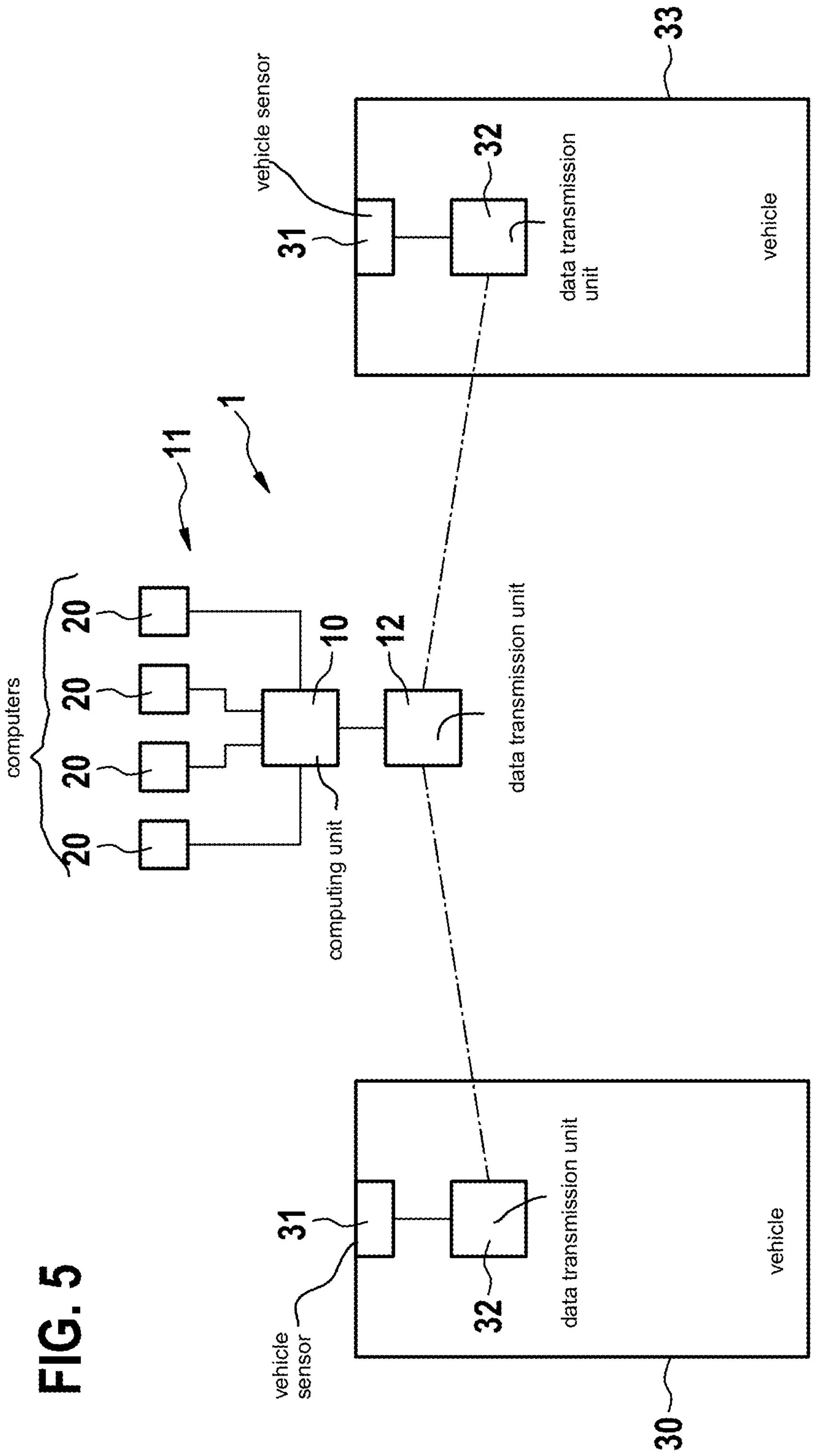
FIG. 5 shows a further system including a computer unit and a vehicle, according to an example embodiment of the present invention.

FIG. 5 shows another system 2 consisting of a computer unit 10 and a vehicle 30. Here, the computers 20 are arranged in a data center 11. The computing unit 10 is also arranged in the computing center 11. The computing unit 10 has a data transmission unit 12. The vehicle 30 has a vehicle sensor 31 and a data transmission unit 32. Data between the vehicle 30 and the computing unit 10 can be transmitted by means of the data transmission units 12, 32, in particular wirelessly.

In an exemplary embodiment not shown, the computing unit 10 can be arranged in the vehicle 30, while the computers 20 are arranged in a computing center 11. Here, the diverse data records can be output wirelessly to the computers 20.

In both the exemplary embodiment in FIG. 4 and FIG. 5, the system 2 consists of the computing unit 10 and the vehicle 30 with the vehicle sensor 31. The vehicle 30 is configured to output sensor data from the vehicle sensor 31 to the computing unit 10 and to receive the digital map.

FIG. 5 also optionally shows another vehicle 33 with a vehicle sensor 31 and a data transmission unit 32. The system 2 can also include more than two vehicles 30, 33 with a vehicle sensor 31 and data transmission unit 31, wherein each of the vehicles 30, 33 is configured to output sensor data from the vehicle sensor 31 to the computing unit 10 and to receive the digital map.

Although the present invention has been described in detail by the preferred exemplary embodiments, the present invention is not limited to the disclosed examples and other variations may be derived therefrom by a person skilled in the art without departing from the scope of protection of the present invention.

What is claimed is:

1. A method for data processing in a vehicle system using hardware secured according to specified security criteria, the method comprising the following steps:
   - receiving input data associated with operation of a vehicle subsystem;
   - generating, by the secured hardware, a plurality of diverse data records from the input data, the diverse data records being intentionally constructed to represent different subsets or distributions of the input data so as to provide independent processing inputs;
   - transmitting the diverse data records to a plurality of computers that are not secured according to the specified security criteria, each of the computers independently processing a respective one of the diverse data records to generate a corresponding processed data record;
   - receiving, by the secured hardware, the processed data records from the plurality of computers;

comparing the processed data records by performing a similarity assessment that evaluates consistency among the processed data records and identifies deviations exceeding a defined threshold;

determining, based on results of the similarity assessment, a final processing result usable by the vehicle subsystem; and controlling the vehicle subsystem in operation of the vehicle using the final processing result.

2. The method according to claim 1, wherein in addition to the diverse data records, a processing program is output to the computers which are not secured according to the specified security criteria.

3. The method according to claim 1, wherein the diverse data records are generated disjointly so that each data point in the input data is only used for a single respective one of the diverse data records.

4. The method according to claim 1, wherein the input data are distributed to the data records based on criteria and/or based on metadata, while generating the diverse data records.

5. The method according to claim 1, wherein the comparison of the processed data records using the similarity assessment is used to adjust the diverse data records, and the diverse data records are then output to various computers which are not secured according to specified security criteria, and the processed data records are read in again.

6. The method according to claim 5, wherein the adapted diverse data records are each output to different computers than in the first output to the computers.

7. A method for generating a digital map of a vehicle system, comprising the following steps:

generating sensor data using vehicle sensors of a vehicle;

receiving the sensor data at hardware secured according to specified security criteria;

generating, by the secured hardware, a plurality of diverse data records from the sensor data, the diverse data records being intentionally constructed to represent different subsets or distributions of the sensor data so as to provide independent processing inputs;

transmitting the diverse data records to a plurality of computers that are not secured according to the specified security criteria, each of the computers independently processing a respective one of the diverse data records to generate a corresponding processed data record;

receiving, by the secured hardware, the processed data records from the plurality of computers;

comparing the processed data records by performing a similarity assessment that evaluates consistency among the processed data records and identifies deviations exceeding a defined threshold;

determining, based on results of the similarity assessment, a final processing result comprising a validated digital map; and outputting the validated digital map for operation of the vehicle.

8. A computing unit comprising:

an input/output interface; and hardware secured according to specified security criteria, wherein the secured hardware is configured to:

receive, via the interface, input data associated with operation of a vehicle subsystem;

generate, by the secured hardware, a plurality of diverse data records from the input data, the diverse data records being intentionally constructed to represent different subsets or distributions of the input data so as to provide independent processing inputs;

transmit, via the interface, the diverse data records to a plurality of computers that are not secured according to the specified security criteria, each of the computers independently processing a respective one of the diverse data records to generate a corresponding processed data record;

receive, via the interface, the processed data records from the plurality of computers;

carry out a comparison of the processed data records using a similarity assessment that evaluates consistency among the processed data records and identifies deviations exceeding a defined threshold;

determine, based on results of the similarity assessment, a final processing result usable by the vehicle subsystem; and control the vehicle subsystem in operation of the vehicle using the final processing result.

9. The computing unit according to claim 8, wherein the computing unit is configured to read in sensor data from vehicle sensors as the input data, and to output a digital map based on the final processing result.

10. A system comprising:

a computing unit that includes:

an input/output interface; and hardware secured according to specified security criteria, wherein the secured hardware is configured to:

receive, via the interface, input data associated with operation of a vehicle subsystem;

generate, by the secured hardware, a plurality of diverse data records from the input data, the diverse data records being intentionally constructed to represent different subsets or distributions of the input data so as to provide independent processing inputs;

transmit, via the interface, the diverse data records to a plurality of computers that are not secured according to the specified security criteria, each of the computers independently processing a respective one of the diverse data records to generate a corresponding processed data record;

receive, via the interface, the processed data records from the plurality of computers;

carry out a comparison of the processed data records using a similarity assessment that evaluates consistency among the processed data records and identifies deviations exceeding a defined threshold;

determine, based on results of the similarity assessment, a final processing result usable by the vehicle subsystem; and control the vehicle subsystem in operation of the vehicle using the final processing result; and a vehicle that includes a vehicle sensor, wherein the vehicle is configured to output sensor data from the vehicle sensor to the computing unit as the input data.

11. The method of claim 1, wherein:

the vehicle subsystem includes a localization or digital map generation subsystem;

determining the final processing result includes detecting inconsistency among the processed data records that exceeds a defined tolerance; and the method further includes updating a digital map based on the detecting of the inconsistency.

* * * * *